United States Patent
Nille

(10) Patent No.: US 8,191,447 B2
(45) Date of Patent: Jun. 5, 2012

(54) METHOD AND DEVICE FOR MACHINING A WORKPIECE THAT ROTATES ABOUT A CENTRAL AXIS

(75) Inventor: Daniel Nille, Mühlhausen (DE)

(73) Assignee: Emag Holding GmbH, Salach (DE)

( * ) Notice: Subject to any disclaimer, the term of this patent is extended or adjusted under 35 U.S.C. 154(b) by 375 days.

(21) Appl. No.: 12/683,086

(22) Filed: Jan. 6, 2010

(65) Prior Publication Data

US 2010/0175518 A1 Jul. 15, 2010

(30) Foreign Application Priority Data

Jan. 12, 2009 (DE) .......................... 10 2009 004 337

(51) Int. Cl.
*B23B 1/00* (2006.01)
*B23B 3/00* (2006.01)
(52) U.S. Cl. ................. 82/1.11; 82/117; 82/1.2
(58) Field of Classification Search .......... 82/1.2, 82/1.4, 70, 70.1, 82, 101, 102, 117, 118
See application file for complete search history.

(56) References Cited

U.S. PATENT DOCUMENTS

| | | | |
|---|---|---|---|
| 2,905,028 A * | 9/1959 | Massari ........................... | 82/1.2 |
| RE32,211 E * | 7/1986 | Jerue et al. ...................... | 82/1.2 |
| 4,766,704 A * | 8/1988 | Brandestini et al. ............ | 451/58 |
| 4,815,239 A * | 3/1989 | Sommer ........................... | 451/5 |
| 5,097,632 A * | 3/1992 | Yamamori et al. ............... | 451/5 |
| 5,442,565 A * | 8/1995 | Galel ............................. | 700/160 |
| 7,216,571 B2 * | 5/2007 | Schreiber et al. .............. | 82/1.11 |
| 2007/0245531 A1* | 10/2007 | Kummer .......................... | 29/2.1 |
| 2008/0022818 A1* | 1/2008 | Hackh et al. ................... | 82/147 |

FOREIGN PATENT DOCUMENTS

| | | |
|---|---|---|
| DE | 19904859 A1 | 8/2000 |
| DE | 19963897 B4 | 6/2001 |
| DE | 10144649 A1 | 3/2003 |
| DE | 102004026675 B3 | 5/2005 |
| DE | 102005027785 A1 | 12/2006 |
| DE | 102005037665 B3 | 1/2007 |

* cited by examiner

*Primary Examiner* — Will Fridie, Jr.
(74) *Attorney, Agent, or Firm* — Martin Fleit; Paul D. Bianco; Fleit Gibbons Gutman Bongini & Bianco PL

(57) ABSTRACT

The invention pertains to a method and device for machining a workpiece (2), which rotates about a central axis (1) by means of a tool (3), which contains at least one planar cutting plate (17) arranged in an inclined plane (E) relative to the central axis (1) of the workpiece (2) and is provided with a curved cutting edge (21) directed toward the workpiece (2), wherein the tool (3) is non-rotatably held during the machining, and wherein the workpiece (2) and the tool (3) are displaced relative to one another along two mutually perpendicular axes (X-axis, Y-axis) within a plane (X-Y plane) that lies perpendicular to the central axis (1) of the workpiece (2) such that the point of action between the cutting plate (17) and the workpiece (2) travels along the cutting edge (21).

12 Claims, 5 Drawing Sheets

US 8,191,447 B2

METHOD AND DEVICE FOR MACHINING A WORKPIECE THAT ROTATES ABOUT A CENTRAL AXIS

CROSS REFERENCE TO RELATED APPLICATION

This application claims priority under 35 U.S.C. §119 to German Application No. 10 2009 004 337.3 filed Jan. 12, 2009, the entire contents of which are incorporated herein by reference.

FIELD OF THE INVENTION

The invention pertains to a method and device for machining a workpiece that rotates about a central axis.

BACKGROUND OF THE INVENTION

A method and device for machining rotationally symmetrical surfaces of a workpiece are known from DE 10 2004 026 675 B3, wherein the workpiece is rotatively driven to effect the cutting motion, and a tool with a cutting edge is moved relative to the workpiece with a feed motion such that the point of action between the cutting edge and the workpiece travels along the cutting edge. For this purpose, the cutting edge has the form of a helical line that extends coaxially to the rotational axis of the tool and is moved about the rotational axis of the tool with an arc-shaped feed motion. This makes it possible to produce unrifled surfaces with high cutting efficiency. However, the manufacture of such tools is relatively complicated due to the complex cutting edge geometry and is associated with correspondingly high costs. The re-sharpening, as well as other measures for preserving the cutting ability of such tools, are also more expensive.

SUMMARY OF THE INVENTION

The invention is based on the objective of developing a method and device for machining a workpiece that rotates about a central axis, wherein said method and device make it possible to manufacture unrifled exterior and interior surfaces in a simplified and cost-efficient manner.

This objective is realized with a method with the characteristics of Claim 1 and with a device with the characteristics of Claim 6. Advantageous embodiments and practical additional refinements of the method of the invention are disclosed in the dependent claims.

In the method of the invention, the machining of the workpiece that rotates about a central axis is carried out with a tool that features at least one planar cutting plate arranged in an inclined plane relative to the central axis of the workpiece and is provided with a curved cutting edge that is directed toward the workpiece, wherein the tool is non-rotatably held during the machining, and wherein the workpiece and the tool are displaced relative to one another along two axes that extend perpendicular to one another and within a plane that lies perpendicular to the central axis of the workpiece such that the point of action between the cutting plate and the workpiece travels along the cutting edge. Simpler and more cost-efficient tools can be used due to the special cutting edge geometry and the relative motions between the workpiece and the tool.

According to one particularly practical embodiment, the tool may be made stationary while the workpiece carries out all movements in the plane that lies perpendicular to the central axis of the workpiece. Consequently, not only the main cutting motion, but also all feed motions and displacements are realized by means of the workpiece. In this embodiment, the tool may remain stationary such that no separate drives are required. However, the tool may also be moveable along at least one axis to realize a relative motion between the workpiece and the tool.

The device of the invention contains a machine stand and a work spindle that is arranged on the machine stand such that it can be moved along several axes and carries a workpiece that rotates about a central axis during the machining. A tool featuring at least one planar cutting plate arranged in an inclined plane relative to the central axis of the workpiece that is provided with a curved cutting edge directed toward the workpiece is arranged on the machine stand, wherein the workpiece and the tool can be displaced relative to one another along two mutually perpendicular axes and within a plane that lies perpendicular to the central axis of the workpiece such that the point of action between the cutting plate and the workpiece travels along the cutting edge. Due to the special design of the cutting edge and the relative motions between the tool and the workpiece in the plane that lies perpendicular to the central axis of the workpiece, the point of action between the cutting plate and the workpiece can travel over the entire length of the cutting edge such that unrifled surfaces can be produced with reduced effort.

In one particularly practical embodiment, the tool is arranged stationary and the work spindle can be displaced relative to the stationary tool along the two mutually perpendicular axes and within the plane that lies perpendicular to the central axis of the workpiece. This makes it possible to realize the machining without additional tool movements.

BRIEF DESCRIPTION OF THE DRAWINGS

Other details and advantages of the invention become apparent from the following description of a preferred exemplary embodiment with reference to the drawing. The drawing shows.

DETAILED DESCRIPTION OF THE INVENTION

Figure 1:
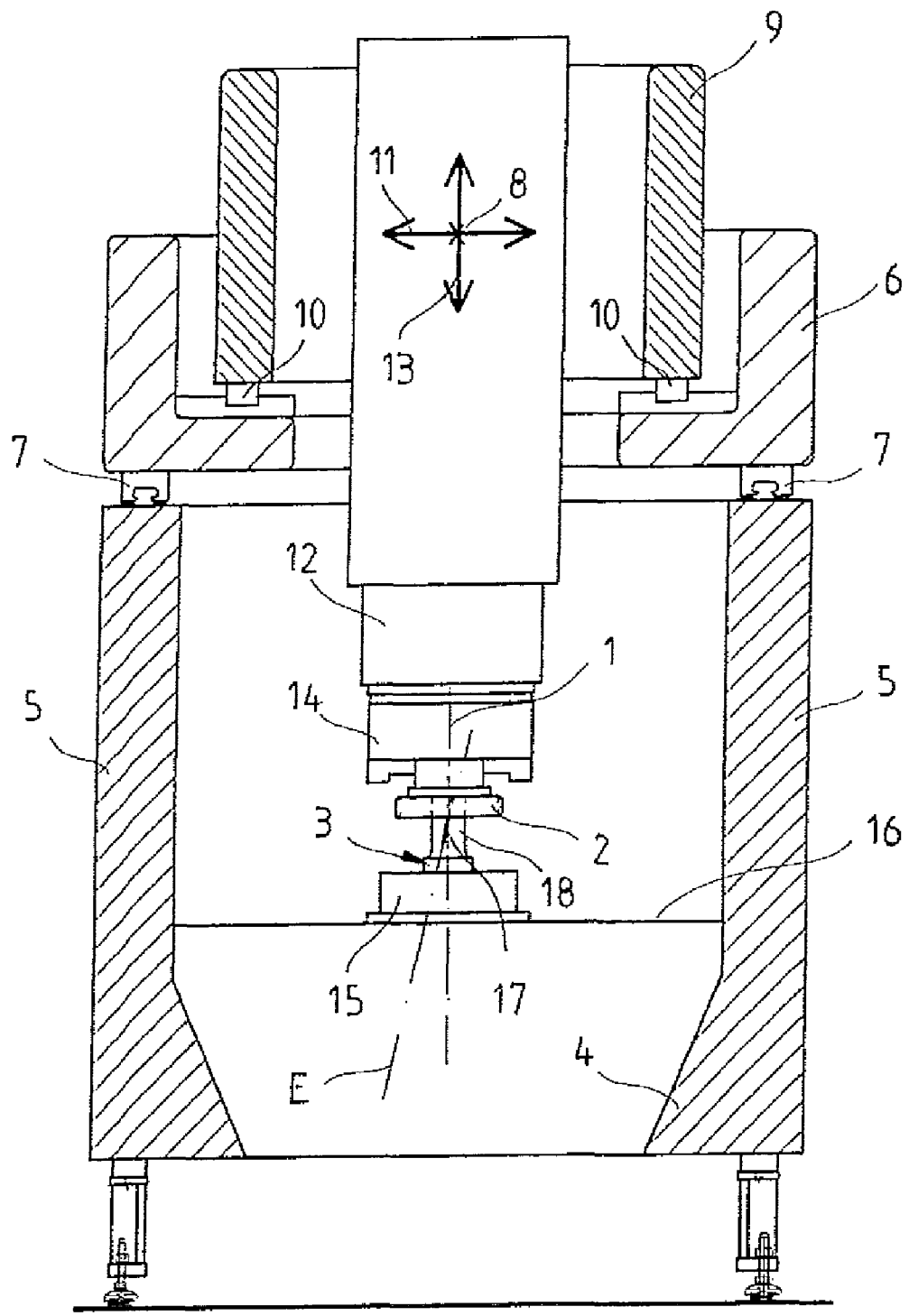
FIG. 1, a schematic front view of a device for machining a workpiece that rotates about a central axis with the aid of a stationary tool.

FIG. 1 shows a schematic front view of a device for machining a workpiece 2, which rotates about a central axis 1 with the aid of a stationary tool 3. The device contains a machine stand 4 with two lateral cheeks 5, on which a first horizontal carriage 6 can be horizontally displaced along a first axis 8 (X-axis) by means of guide rails 7. A second horizontal carriage 9 can be horizontally displaced by means of guide rails 10 on the first horizontal carriage 6 along a second axis 11 (Y-axis) that runs perpendicular to the first axis 8. A vertical work spindle 12 that is preferably realized in the form of a motor spindle is arranged on the second horizontal carriage 9 such that it can be vertically displaced along a third axis 13 (Z-axis) that runs perpendicular to the first two axes 8 and 11.

The workpiece 2 to be machined is clamped on the rotatively driven vertical work spindle 12 by means of a clamping device 14 in the form of a chuck or the like. The rotatory main cutting motion therefore is realized by means of the work spindle 12. The stationary tool 3 is immovably mounted on a machine table 16 of the machine stand 4 by means of a clamping device 15 and features a planar cutting plate 17 that is arranged on the outside of a tool carrier 18 of circular cross section in a plane E that is inclined relative to the central axis 1 of the workpiece 2. The tool carrier 18 is arranged in such a way that its longitudinal axis 19 shown in FIG. 2 runs parallel to the central axis 1 of the workpiece 2.

Figure 2:
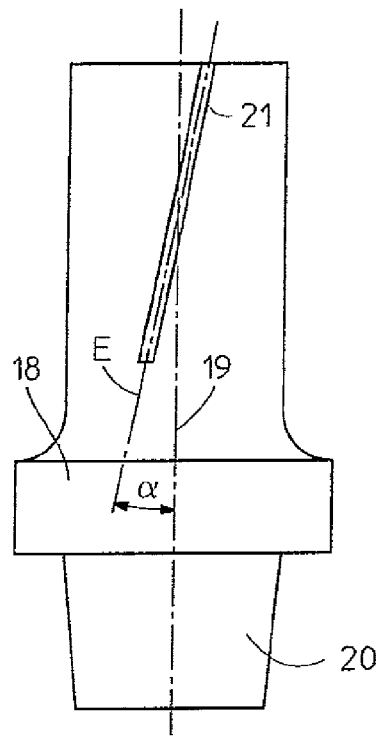
FIG. 2, an enlarged front view of a tool of the device according to FIG. 1.
Figure 3:
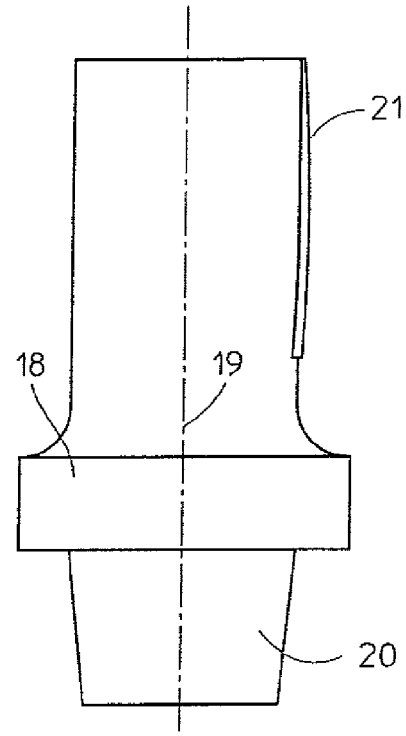
FIG. 3, a side view of the tool according to FIG. 2.
Figure 4:
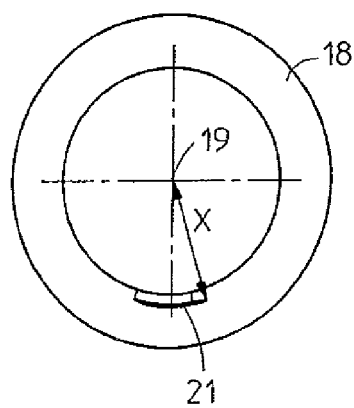
FIG. 4, a top view of the tool according to FIG. 2.

FIGS. 2 to 4, in particular, show that the underside of the tool carrier 18 with its cylindrical upper region features a clamping cone 20, by means of which the tool 3 can be clamped on the machine table 16 with the aid of a corresponding clamping device 15. The cutting plate 17 arranged on the outside of the cylindrical part of the tool carrier 18 in the inclined plane E is inclined relative to the central axis 1 of the workpiece 2 and the longitudinal axis 19 of the tool carrier 18 at an acute angle α. The planar cutting plate 17 features a cutting edge 21 that runs along a straight line inclined at the angle α in the front view according to FIG. 2 and in an outwardly curved, elliptical manner in the side view according to FIG. 3.

Figure 5:
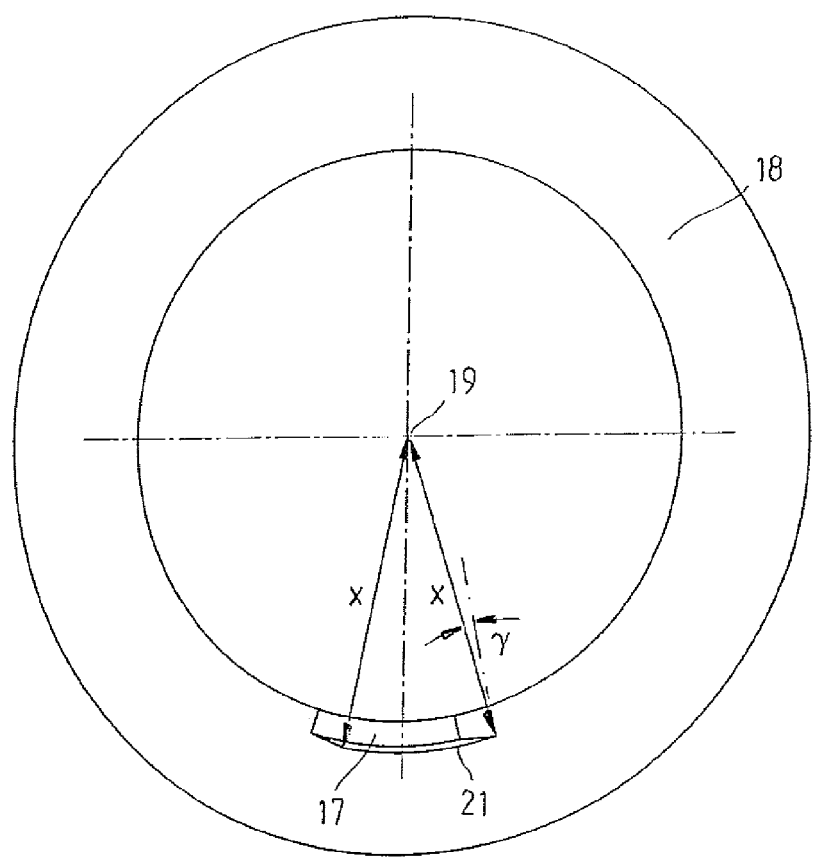
FIG. 5, an enlarged top view of the tool according to FIG. 2.
Figure 6:
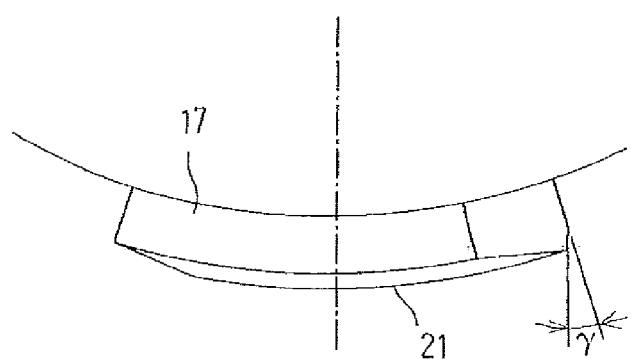
FIG. 6, an enlarged top view of a cutting plate with negative rake angle.

In the top view according to FIG. 4, the cutting edge 21 has the form of an arc, and all points on the cutting edge 21 are at the same distance x from the longitudinal axis 19 of the tool carrier 18. This is illustrated particularly well in the enlarged top view of the tool 3 in FIG. 5. In the embodiment shown in FIG. 5, the cutting plate 20 has a positive rake angle γ. A positive rake angle γ is preferably used for soft machining. This makes it possible to machine pump housings, e.g., of brass, etc. However, the cutting plate 17 may also have a negative rake angle γ as schematically illustrated in FIG. 6. Such a cutting edge geometry is particularly suitable for machining hardened workpieces, e.g., with a Brinell number HRT=50 or more.

Figure 7:
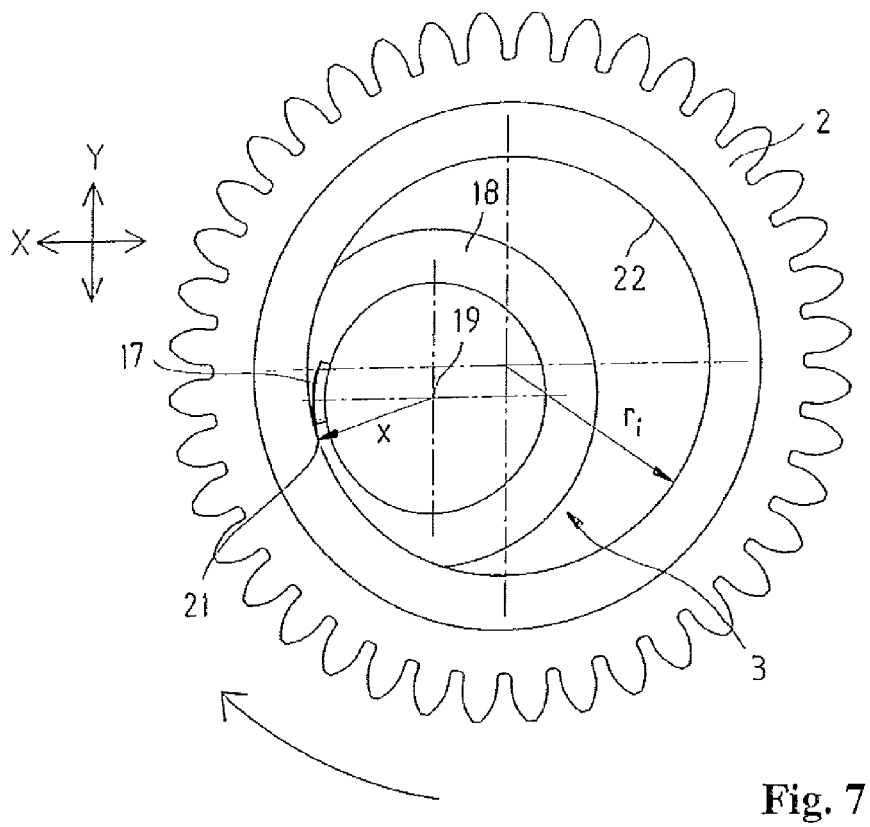
FIGS. 7, 8, schematic representations of the motion sequence during the machining of the workpiece interior, and FIGS. 9, 10, schematic representations of the motion sequence during the machining of the workpiece exterior.
Figure 8:
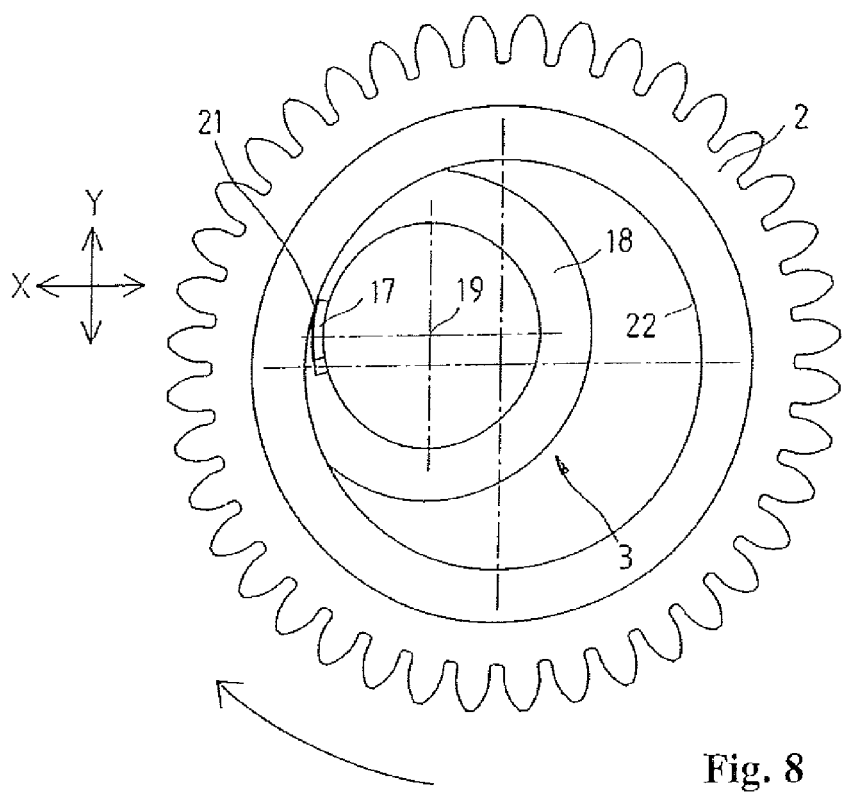

FIGS. 7 and 8 show the motion sequence during the machining of a cylindrical interior surface 22 of a workpiece 2 in the form of a gear with the aid of the tool 3 illustrated in FIGS. 2 to 4. The tool 3 with the cutting plate 17 is arranged stationary while the workpiece 2 that is rotatively driven about the central axis 1 by the work spindle 12 is moved along an arc within the X-Y plane by moving the two horizontal carriages 6 and 9 along the X- and Y-axes, such that the point of action between the cutting plate 17 and the workpiece 2 travels along the cutting edge 21. In this case, the center of the workpiece 2 moves around the tool 3 along an arc, wherein the radius of the arc corresponds to the inside radius $r_i$ of the workpiece 2 minus the distance x of the cutting edge 21 from the longitudinal axis 19 of the tool 3.

Figure 9:
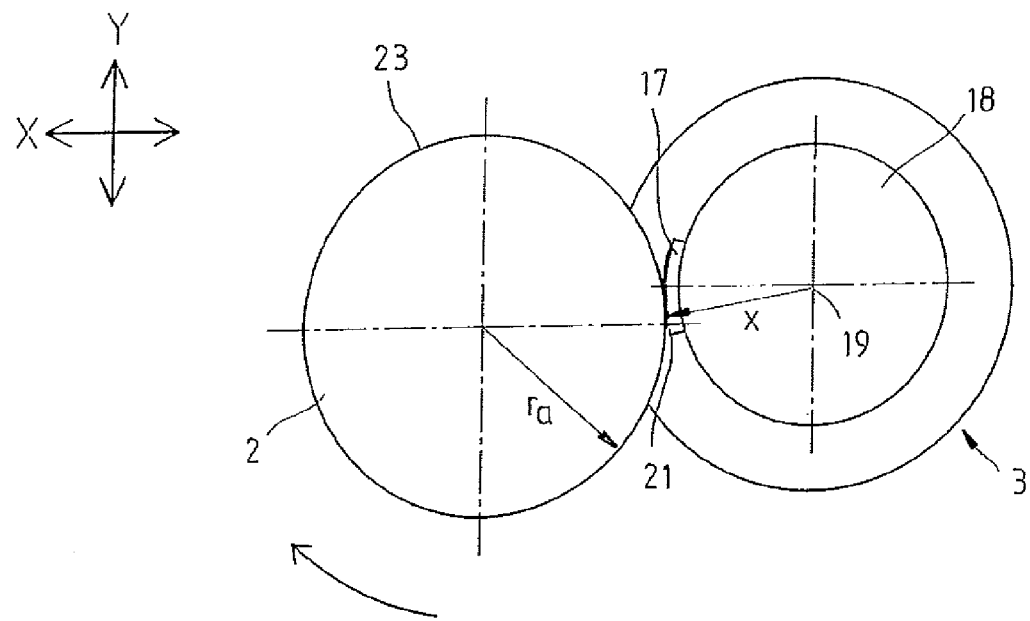
Figure 10:
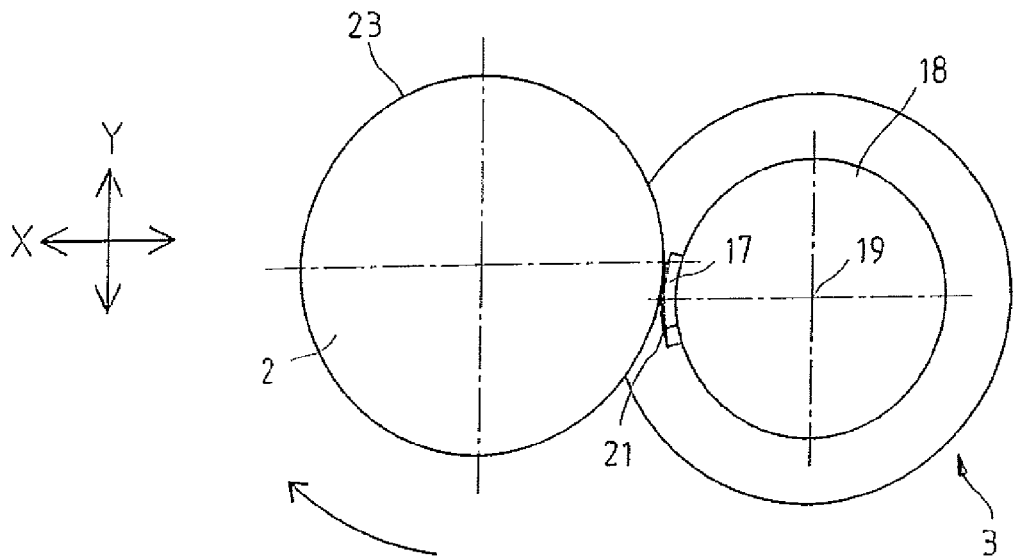

FIGS. 9 and 10 show the motion sequence for machining a cylindrical exterior surface 23 of a workpiece 2 with the aid of the tool 3 illustrated in FIGS. 2 to 4. In this case, the tool 3 with the cutting plate 17 is also arranged stationary, and the workpiece 2 rotatively driven about the central axis 1 by the work spindle is moved along an arc within the X-Y plane by displacement of the two horizontal carriages along the X- and Y-axes such that the point of action between the cutting plate 17 and the workpiece 2 travels along the cutting edge 21. In this case, the center of the workpiece 2 moves around the tool 3 along an arc, wherein the radius of the arc corresponds to the outside radius $r_a$ of the workpiece 2 plus the distance x of the cutting edge 21 from the longitudinal axis 19 of the tool 3.

The invention claimed is:

1. Method for machining a workpiece (2) that rotates about a central axis (1) by means of a tool (3), which contains at least one planar cutting plate (17) arranged in an inclined plane (E) relative to the central axis (1) of the workpiece (2) and is provided with a curved cutting edge (21) that is directed toward the workpiece (2), wherein the tool (3) is non-rotatably held during the machining, and wherein the workpiece (2) and the tool (3) are displaced relative to one another along two axes mutually perpendicular (X-axis, Y-axis) within a plane (X-Y plane) that lies perpendicular to the central axis (1) of the workpiece (2) such that the point of action between the cutting plate (17) and the workpiece (2) travels along the cutting edge (21).

2. Machining method according to claim 1, wherein the workpiece (2) is moved relative to the tool (3) along an arc on the cutting edge (21) of the tool (3).

3. Machining method according to claim 1, wherein a cylindrical interior surface (22) of the workpiece (2) is machined by moving the workpiece relative to the tool (3) in the plane (X-Y plane) that lies perpendicular to the central axis (1) such that the center of the workpiece (2) moves around the tool (3) along an arc, wherein the radius of the arc corresponds to the inner radius $r_i$ of the workpiece (2) minus the distance x of the cutting edge (21) from a longitudinal axis (19) of the tool (3).

4. Machining method according to claim 1, wherein a cylindrical exterior surface (23) of the workpiece (2) is machined by moving the workpiece relative to the tool (3) in the plane (X-Y plane) that lies perpendicular to the central axis (1) such that the center of the workpiece (2) moves around the tool (3) along an arc, wherein the radius of the arc corresponds to the outer radius $r_a$ of the workpiece (2) plus the distance x of the cutting edge (21) from a longitudinal axis (19) of the tool (3).

5. Method according to claim 1, wherein the tool (3) is held stationary during the machining and that the workpiece (2) is displaced within the plane (X-Y plane) that lies perpendicular to the central axis (1) of the workpiece (2) along the two mutually perpendicular axes (X-axis, Y-axis).

6. Machining device with a machine stand (4) and a work spindle (12) that is arranged on the machine stand (4) such that it can be displaced along several axes and carries a workpiece (2) that rotates about a central axis (1) during the machining, wherein a tool (3) featuring at least one planar cutting plate (17) that is inclined relative to the central axis (1) of the workpiece (2) and provided with a curved cutting edge (21) directed toward the workpiece (2) is arranged on the machine stand (4), and wherein the workpiece (2) and the tool (3) can be displaced relative to one another along two mutually perpendicular axes (X-axis, Y-axis) within a plane (X-Y plane) that lies perpendicular to the central axis (1) of the workpiece (2) such that the point of action between the cutting plate (17) and the workpiece (2) travels along the cutting edge (21).

7. Device according to claim 6, wherein the work spindle (12) can be displaced relative to the stationarily arranged tool (3) within the plane (X-Y plane) that lies perpendicular to the central axis (1) of the workpiece (2) along the two mutually perpendicular axes (X-axis, Y-axis).

8. Device according to claim 6, wherein the planar cutting plate (17) is arranged on the outside of a tool carrier (18) in a plane (E) that is inclined relative to the central axis (1) of the workpiece (2).

9. Device according to claim 8, wherein the tool carrier (18) is arranged such that its longitudinal axis (19) extends parallel to the central axis (1) of the workpiece (2).

10. Device according to claim 9, wherein all points on the cutting edge (21) are at the same distance (x) from the longitudinal axis (19) of the tool carrier (18).

11. Device according to claim 6, wherein the cutting edge (21) is elliptically curved outwardly.

12. Device according to claim 6, wherein the cutting plate (17) has a positive or negative rake angle $\gamma$.

* * * * *